United States Patent Office 3,077,176
Patented Feb. 12, 1963

3,077,176
MAGNETIC PRESSURE-RESPONSIVE DEVICES
David B. Pall, Roslyn Estates, and Mathias P. L. Siebel, Glen Cove, N.Y., assignors to Pall Corporation, Glen Cove, N.Y., a corporation of New York
Filed Apr. 6, 1961, Ser. No. 101,298
12 Claims. (Cl. 116—70)

This invention relates to pressure-responsive devices, such as pressure indicators and transducers, wherein the occurrence of a pressure differential greater than a predetermined value between two parts of the same or different systems results in actuating a magnetic device to give an indication thereof or to operate a switch or like device.

In fluid systems wherein fluid such as oil or gases or the like is passed through a filter or a process vessel, it is desirable to provide external means for indicating clogging of the filter element or vessel, such as may result from accumulation of sufficient dirt or contaminant to impede the flow of fluid therethrough. Inasmuch as the pressure drop across the filter or vessel increases in proportion to the accumulation of dirt or contaminant in and on the filter element or vessel, a suitable indication may be obtained by utilizing a differential pressure device arranged to be actuated when the pressure drop thereacross reaches a predetermined value. Such differential pressure devices can also be employed to actuate a switch or other mechanism, for the purpose, for example, of giving an audible or illuminated signal, or shutting off the flow of fluid.

In U.S. Patent No. 2,942,572, issued June 28, 1960, and copending divisional application Serial No. 11,928, filed February 29, 1960, of which this application is a continuation-in-part, pressure-responsive devices are described which have a particularly effective magnetically controlled indicating assembly. However, these devices give best results at pressure differentials of 15 p.s.i. and above, and may give unreliable responses at pressure differentials below 15 p.s.i. The present invention provides pressure-responsive devices especially adapted to operate at pressure differentials below 15 p.s.i., although they are of course operative at pressures well above this as well, and are capable of response over a range of from 0.01 up to about 250 p.s.i. and more, and of withstanding system pressures up to about 5000 p.s.i. as well.

In the pressure-indicating device of the invention, a flexible magnetic diaphragm assembly adapted to respond to changes in pressure is arranged to attract a magnetic element adapted to give an indication of any such changes in pressure. The magnetic diaphragm assembly attracts the magnetic element as long as the two are separated by less than a predetermined distance. The magnetic diaphragm is of magnetic, flexible material, or it may be composed of a flexible magnetic or nonmagnetic diaphragm material and a second magnetic element so associated therewith that both are movable responsive to changes in pressure. Both types are encompassed herein by the term "magnetic diaphragm assembly." The magnetic diaphragm assembly normally is biased towards the magnetic element by a predetermined force. The magnetic element, normally retained toward the magnetic diaphragm by magnetic attraction, is urged away from the diaphragm by a spring capable of overcoming the magnetic attraction when the two magnetic elements are separated by a predetermined distance. Thus, movement of the diaphragm in response to a pressure differential greater than a predetermined amount, so as to separate the diaphragm from the magnetic element by the predetermined distance, results in movement of the magnetic element to give an indication of the change in pressure differential.

In order to prevent actuation at low temperatures, a bimetallic strip can be positioned to prevent movement of the magnetic element when the temperature is below a predetermined value.

Figure 1:
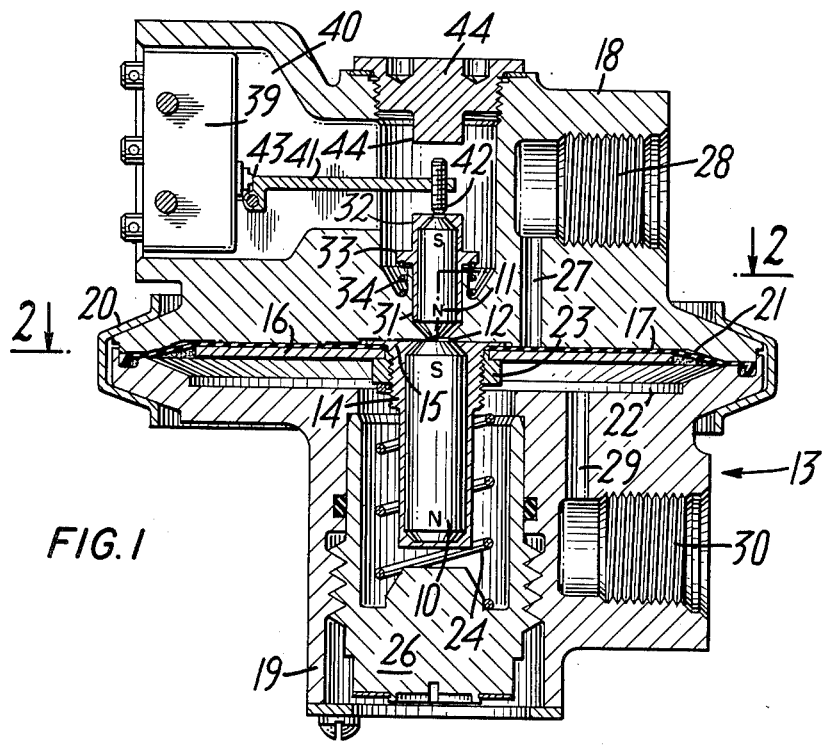
FIGURE 1 is a view in longitudinal section taken along the center line of a typical pressure-responsive device arranged according to the invention to actuate a switch.
Figure 2:
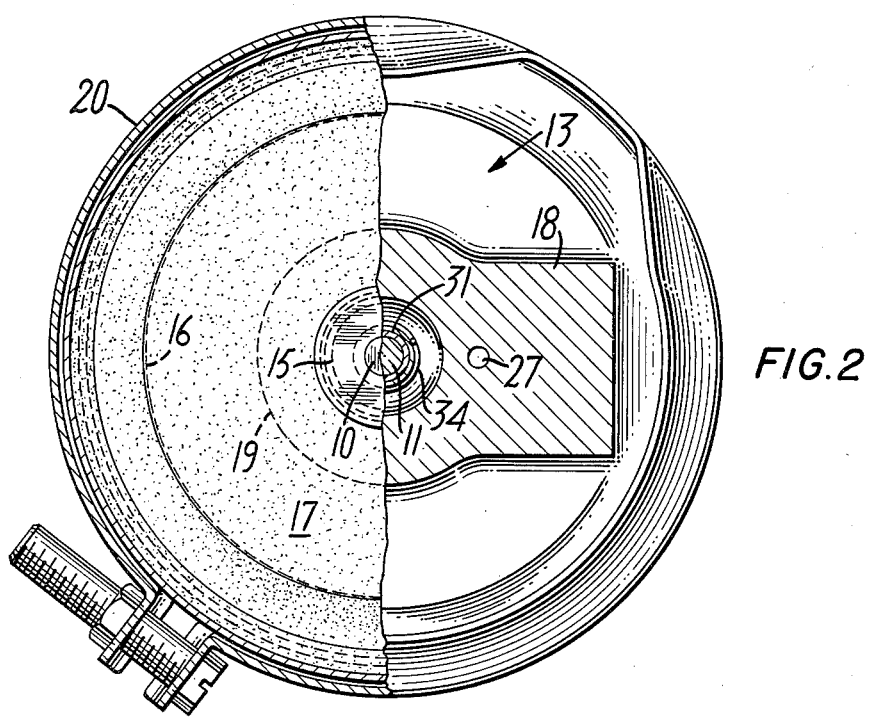
FIGURE 2 is a sectional view, taken on the lines 2—2 of FIGURE 1, and looking in the direction of the arrows.

The pressure-responsive transducer of FIGURES 1 and 2 comprises two magnetic elements, 10 and 11, coaxially mounted on opposite sides of a separating wall 12 within a housing 13. Preferably, both the elements 10 and 11 are composed of permanently magnetized Alnico VI or the like, and are positioned with opposite magnetic poles opposite the wall 12, so that each is drawn toward the wall by the resulting force of attraction. If desired, however, only one of these elements need be a permanent magnet and the other may be formed of suitable magnetic materials, such as iron, for example.

Figure 3:
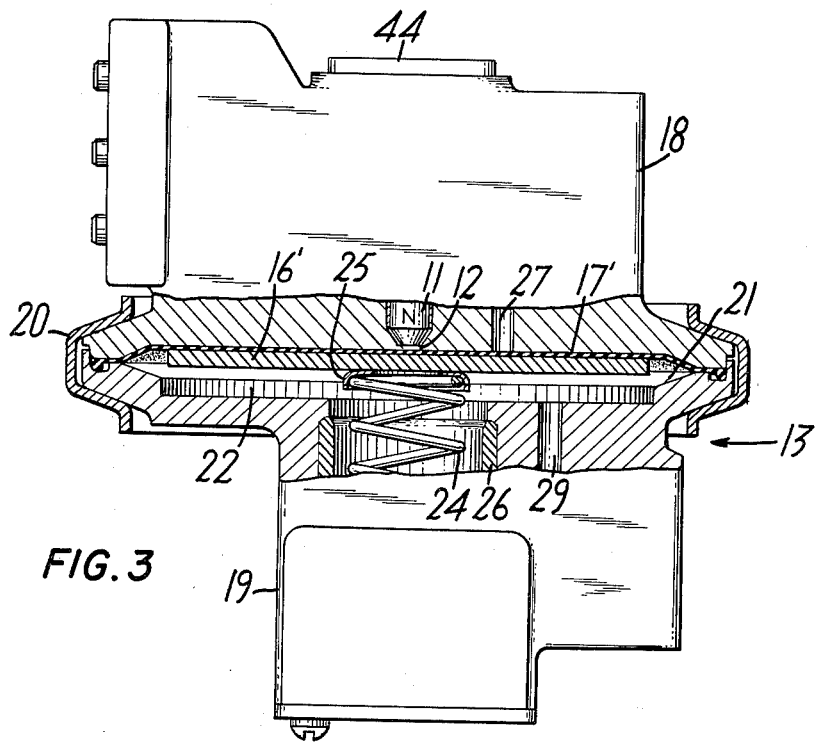
FIGURE 3 is a full view with parts shown in section of a pressure-responsive device of the type shown in FIGURE 1 but with a magnetic diaphragm.

The magnet 10 is mounted in a tubular sleeve 14 having an enlarged head portion 15. The sleeve is inserted through the central aperture of a plate 16, attached thereto by a nut 23, and the plate 16 and enlarged head 15 of the sleeve between them hold a flexible rubber diaphragm 17 in a liquid-tight seal. The attachment between the diaphragm 17 and the plate 16 can be improved, if desired, by bonding the two together. The assembly of the magnet 10, sleeve 14, plate 16, nut 23 and diaphragm 17 together constitutes a magnetic diaphragm assembly of the invention, since all respond together to magnetic attraction due to element 11 and to pressure-actuated movement of the diaphragm 17. The diaphragm may be formed of any flexible material, such as, for example, a flexible metal sheet or a flexible synthetic resin or cellulose derivative such as cellulose acetate, polytetrafluoroethylene, polypropylene, polyethylene, or polyvinylidene chloride. The metal sheet can be of magnetic material, such as Alnico VI, or of magnetizable material, such as an iron or nickel alloy. If the sheet is of magnetic material, a separate magnetic element 10 may not be required. Such an embodiment is shown in FIGURE 3 The plate 16 also can be of magnetic or magnetizable material, if desired, and the diaphragm of nonmetallic material, in which event the magnetic element 10 may be omitted.

The housing 13 is formed in upper and lower portions 18 and 19, respectively, held together by a V-band clamp 20. The outer periphery of the diaphragm 17 is held between the two portions of the housing in a liquid-tight seal. Thus, fluid is prevented from passing from one side of the diaphragm to the other, or from the inside to the outside of the housing.

The upper and lower portions of the housing between them define a chamber 21 provided with a lower recessed portion 22 to accommodate the plate 16. The diagram, plate and sleeve are free to move within the chamber 21, the sleeve being reciprocatingly supported at the nut 23 upon a coil spring 24 which urges the diaphragm assembly toward the wall 12. The coil spring is selected according to the desired actuating pressure to permit the diaphragm assembly to move downwardly when the pressure at the upper surface of the diaphragm 17 exceeds that at the lower surface by an amount equal to the actuating pressure. The large surface of the diaphragm provides great sensitivity to small changes in pressure differential across the faces of the diaphragm. Provision is made for adjustment of the pressure exerted by the spring by a screw 26.

Introduction of fluid within the chamber 21 to both sides of the diaphragm 17 is by way of passage 27 and port 28 in the upper portion 18 of the housing, giving access to the portion of chamber 21 above the upper face of the diaphragm, and by way of passage 29 and port 30 in the lower portion 19 of the housing, giving access to chamber 22 and the lower face of the diaphragm. These in turn are connected to the portions of the fluid system or systems across which the pressure differential is to be detected by the pressure indicator.

In order to prevent dirt carried by fluid from entering ports 28 and 30 and from reaching the narrower passages 27 and 29 and clogging these passages or the chamber 21, filter elements can be inserted in the enlarged outer portion of the ports.

In the embodiment of the invention shown in FIGURES 1 and 2, the pressure indicator is adapted to provide an electrical signal to warn of a clogged filter or to stop fluid flow. The magnetic element 11 is slidably received at one end of a bore 31. Secured to the opposite end of a magnet 11, by a press fit, for example, a cap 32 is provided which includes a flange 33, the lower face of which receives a coil spring 34 which extends from the flange 33 to the housing 18 and normally urges the cap and the magnet 11 away from the wall 12. This spring is selected so that it is retained in the stressed condition, with the magnet 11 held against the wall 12 by the mutually attractive force of the two magnetic elements 10 and 11, as long as the adjacent poles of the two magnets are separated by less than a predetermined distance, for example, one-sixteenth of an inch. Whenever the magnetic element 10 is moved away from the magnet 11, such as by movement of the diaphragm 17 in response to an increase in differential pressure, so that their adjacent poles are separated by more than one-sixteenth of an inch, however, the decreased force of the magnetic attraction resulting therefrom is overcome by the force of the spring 34, and the cap 32 and magnet 11 then are driven away from the wall 12.

A switch 39 is mounted in a recess 40, affixed to the upper portion of the housing 18. Also mounted in the recess is a lever 41, pivotally supported on the housing so as to extend above the cap 32. Attached to one end of the arm 41 is an adjusting or set screw 42, and attached to the other end of the arm is a switch actuator 43, movable by the arm to actuate the switch 39 when the cap 30 rises into contact with the set screw 42 and sufficiently moves arm 41. In order to restrict the motion of the magnet 11, and prevent it from rising completely out of the bore 29, an opposing stop piece 44 is mounted in the housing in postion to intercept the set screw 42 of the lever 41 at a limiting position, so set as to stop the lever 41 after actuation to hold the magnet 11 within one-sixteenth of an inch of the normal position, thereby making the indicator automatically resetting by attraction of the magnetic element 10 upon return of the diaphragm 17 to the normal position. For this piece 44 then may be substituted a manually operated button to reset the magnet 11 after normal operating conditions are restored. To provide a remote signal of actuation of the indicator, suitable conductors (not shown) from the switch 39 can be arranged in any conventional manner to complete appropriate electrical circuits whenever the switch is operated or reset.

In operation, fluid under pressure from port 28 passes through the passage 27 to the top of the chamber 21, above the diaphragm, urging the diaphragm assembly downwardly against the force of the spring 24, and the fluid pressure below the diaphragm, communicated through passage 29 and port 30. Whenever the difference between the inlet and outlet pressure forces across the diaphragm is greater than the force of the spring 24, the diaphragm assembly is driven downwardly. After the magnet 10 has moved to a position more than one-sixteenth of an inch away from the magnet 11, the attractive force between the two magnets is less than the force of the spring 34, and the magnetic element 11 is then driven away from the wall 12 until the cap 32 contacts and lifts the set screw 42, thus raising the lever 41 to actuate the switch 39 through application of pressure through the switch actuator 43. When the diaphragm is fully deflected, plate 16 enters recess 22, which serves as a stop to prevent further deflection, and prevents damage from overpressuring. If the stop piece 44 is appropriately adjusted to restrict the motion of the magnet 11, return of the magnet 10 to its normal position draws the magnet 11 back toward the wall 12, restoring the switch.

This device may sense pressure differentials of from 0.01 to 16 p.s.i.

The diaphragm 17' in FIGURE 3 is formed of a flexible material which is nonmagnetic, such as a synthetic resin or cellulose derivative, or a flexible metal sheet such as stainless steel, attached to a plate 16' made of magnetic material, such as Alnico VI. The magnetic element 10 of FIGURES 1 and 2 is omitted, inasmuch as the plate 16' is magnetic. In other respects, the device is similar to that of FIGURES 1 and 2.

Figure 5:
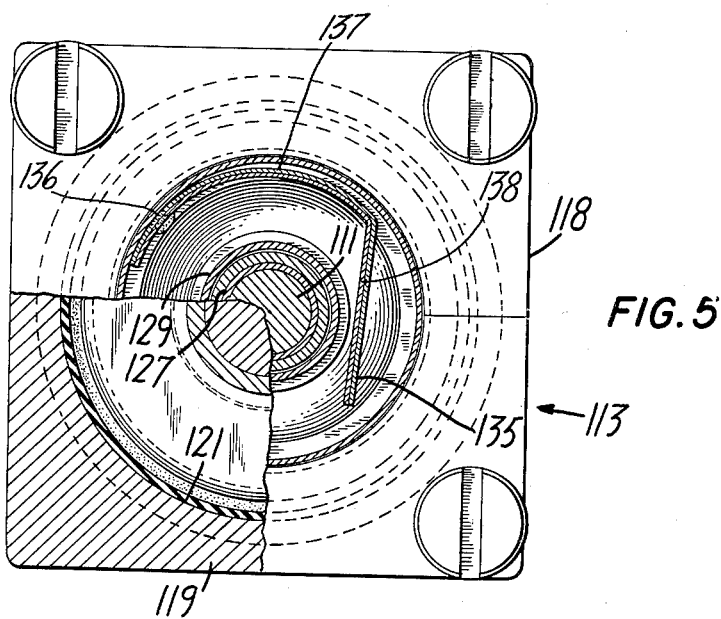
FIGURE 5 is a sectional view taken on the lines 5—5 of FIGURE 4, and looking in the direction of the arrows.
Figure 4:
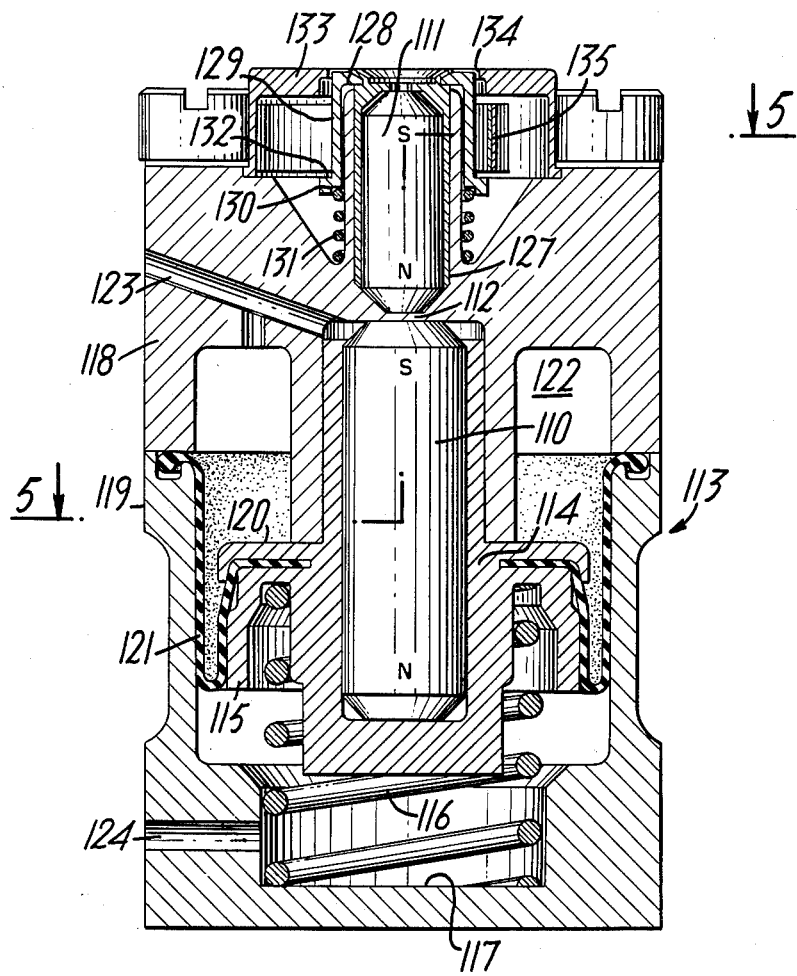
FIGURE 4 is a view in longitudinal section taken along the center line of a typical pressure-responsive device arranged according to the invention, to actuate an indicator.

As shown in FIGURES 4 and 5, a representative pressure indicator arranged to give a visual signal comprises two magnetic elements 110 and 111, coaxially mounted on opposite sides of a separating wall 112 within a housing 113. As in FIGURES 1 and 2, the elements 110 and 111 can be composed of permanently magnetized Alnico VI, and are positioned with opposite magnetic poles adjacent the wall 112, so that each is drawn toward the wall by the resulting force of attraction.

Mounted in a tubular piston 114, the magnet 110 is reciprocatingly supported in the lower portion 119 of the housing, and is urged toward the wall 112 by a coil spring 116 enclosed at its upper portion beneath a downturned flange 115 of the piston and at its lower portion in a recess 117 in the housing. The coil spring 116 is selected according to the desired actuating pressure to permit the piston 114 to move downwardly whenever the pressure at the flange 120 and at the top face of the magnet the exposed face of the flexible folded diaphragm 121 exceeds that exerted by the spring by an amount equal to the actuating pressure.

The piston 114 is provided with an upper flange 120 and the flexible diaphragm 121 is held between the two flanges in a liquid-tight seal. The outer periphery of the diaphragm is attached in a liquid-tight seal between the upper portion 118 and the lower portion 119 of the housing. The diaphragm, flanges, piston and magnet together constitute a magnetic diaphragm assembly in accordance with the invention. The diaphragm is formed of rubber, but it can be made of any flexible material, such as, for example, a synthetic resin or cellulose derivative, such as polytetrafluoroethylene, polyethylene, polypropylene and polyvinylidene chloride. The great surface areas of the flange 120 and diaphragm 121 impart great sensitivity to small differences in differential pressure.

The upper and lower portions 118 and 119, respectively, of the housing define between them a chamber 122 within which the piston 114 and attached parts including the diaphragm are free to move toward and away from the wall 112. Ducts 123 and 124 are provided for admission of fluid to the opposite sides of the diaphragm 121. These ports can be connected to the portions of a fluid system between which a pressure differential is to be measured by the pressure indicator.

If desired, in order to prevent dirt carried by incoming fluid from entering ducts 123 and 124, and to make certain that any fluid which may enter the chamber 122 is clean, suitable filter elements (not shown) may be inserted in an enlarged portion of the ducts.

On the other side of the wall 112 the magnetic element 111 is slidably received at one end of a bore 127. Secured to the opposite end of the magnet 111, by a press fit, for example, a cap 128 is provided which includes a tubular wall 129 extending toward the housing 118 and radially spaced from the magnet. The annular recess 130 thus formed receives a coil spring 131, which extends from the cap 128 to the housing 118 to urge the cap and the magnet 111 away from the wall 112. This spring is selected so that it is retained in the stressed condition, with the magnet 111 held against the wall 112 by the attractive force of the two magnetic elements as long as the adjacent poles of the two magnets are separated by less than the predetermined distance, for example, one-sixteenth of an inch. Whenever the magnetic element 110 is moved away from the element 111 so that their adjacent poles are separated by more than one-sixteenth of an inch, however, the decreased force of magnetic attraction resulting therefrom is overcome by the force of the spring 131, and the cap 128 and element 111 are driven away from the wall 112 so that the cap 128 rises from the housing 118 to an indicating position. The cap can be painted an eye-catching color, for example, red.

In order to prevent the magnet 111 from being driven completely out of the bore 127, the tubular wall 129 terminates in a radial flange 132, and a drum 133, having a central aperture 134 slightly smaller than the flange 132 but large enough to permit the cap 128 to pass through it is mounted in the housing 118. Also, a conventional bimetallic element 135 is mounted at one end on the inside surface of the drum 133, as by a weld 136. As best seen in FIGURE 5, the bimetallic element is preferably comprised of two arcuate strip portions 137 and 138, both arranged to bend inwardly with decreasing temperatures. At normal temperatures, the element 135, which is adjacent the wall 129, and just above the flange 132 when the indicator is not actuated, has a minimum radius greater than the flange 132, and permits the cap 128 to rise through the aperture 134 on actuation. However, at temperatures below a preselected value, at which the viscosity of the fluid to be filtered increases appreciably, for example, 32° F., the element 135 contracts inwardly so that the inner strip 138 extends over the flange 132, thus preventing actuation of the pressure indicator.

In operation, fluid under pressure passes through the duct 123 into the upper part of the chamber 122 above the diaphragm 121, urging the magnet 110 and piston 114 downwardly against the force of the spring 116 and the pressure from the line 124. Whenever the difference between the inlet and outlet pressure forces is greater than the force of the spring 116, the piston 114 is driven downwardly in the bore 115. After the magnet has moved to a position more than one-sixteenth of an inch away from the magnet 111, the attractive force between the two magnets is less than the force of the spring 131, and the magnet element 111 is driven away from the wall 112 until the flange 132 abuts the inside surface of the drum 133. Thus, the cap 128 rises through the aperture 134 to indicate that the pressure difference is greater than the predetermined value in accordance with which the spring 116 has been selected. As an example, the spring 116 may be arranged to permit the magnet 110 to be driven away from the wall 112 when the pressure difference exceeds 35 p.s.i.

It will be apparent that by suitable dimensioning of the drum 133 and the radial flange 132, the magnet 111 may be permitted to move more than one-sixteenth of an inch from the normal position of the magnet 110. In this case, the pressure indicator remains in this position until noticed and reset by manual depression of the cap 128. On the other hand, if the flange 132 is positioned to stop the magnet 111 less than one-sixteenth of an inch from the normal position, the indicator will be automatically reset by the attractive force of the magnets, which is greater than that of the spring 131 at this distance, when the magnet 110 is returned to the wall 112.

At temperatures below 32° F., for example, the thermostatic element 135 contracts to move the inner end of the strip 138 over the flange 132. Thus, when the piston 114 and the magnet 110 are moved away from the wall 112 by pressure resulting from increased viscosity of the fluid, strip 138 intercepts the flange 132, preventing a false indication of filter clogging.

This device senses pressure differentials of from about 0.5 to about 100 p.s.i.

It will be apparent from the above description that the pressure-responsive devices of the invention can be employed as pressure transducers to control operation of all sorts of devices such as, pumps, warning devices, switches, and the like, in response to movement of the magnetic elements by suitable adaptation. The pressure-responsive devices can be used as flow indicators, flow switches, pressure switches of both fixed and variable bias, differential pressure switches, and Mach switches. The pressure-responsive devices of the invention provide for appropriately large deflections of the diaphragm giving the devices the ability to sense a large range of pressure differentials, and room to provide for a relatively large movement of the diaphragm for a small pressure differential. At the same time, the large surface area of the diaphragm gives remarkable sensitivity to small changes in the normal pressure differential. Furthermore, since each face of the diaphragm is open to fluid pressure, the device responds directly to small pressure differentials practically independently of internal pressure and temperature. Since the device responds directly to pressure differentials, it eliminates the need for measuring two pressures with two pressure indicators, and avoids the problems of measuring accurately two high pressures with different indicators. The element is inexpensive, and easily mass-produced due to the simplicity of construction.

Use of a magnet obviates the need for a mechanical linkage or electrical connection into one of the pressure chambers. Therefore, the leakage, pressure, conductivity and corrosion problems that accompany use of such connections are eliminated. Since the indication is by means of a magnetic detent, there is no danger of dither near the actuation point.

By proper spacing and configuration of the pressure chamber walls defined within the housing, the diaphragm can be fully supported when fully deflected within its stress limit, thus preventing overstressing and damage from over-pressuring of the diaphragm. The pressure-responsive devices can be used in any transducer system which is to be actuatable in response to the pressure differential between two systems or in two parts of the same system.

We claim:

1. A pressure-responsive device comprising a housing, a flexible magnetic diaphragm assembly movably mounted in the housing, toward and away from a first position, bias means urging the diaphragm assembly in one direction and normally retaining the same in the first position, fluid duct means communicating with a source of fluid under pressure and with one face of the diaphragm assembly to urge it in the opposite direction, magnetic means movable toward and away from the magnetic diaphragm assembly and normally retained toward the assembly by magnetic attraction when the assembly is in the first position, and bias means urging the magnetic means away from the assembly selected to overcome the force of the magnetic means when the assembly means is more than a predetermined distance away therefrom.

2. A pressure-responsive device in accordance with claim 1, in which the flexible diaphragm assembly comprises a diaphragm of flexible nonmagnetic material and a magnetic means attached thereto.

3. A pressure-responsive device in accordance with claim 1, in which the flexible diaphragm assembly comprises a diaphragm of flexible nonmagnetic material and a magnetic plate attached thereto.

4. A pressure-responsive device in accordance with claim 1, including stop means limiting the motion of the magnetic means.

5. A pressure-responsive device according to claim 1, wherein the stop means permits the second magnetic means to move more than the predetermined distance away from the first position of the first magnet means.

6. A pressure-responsive device according to claim 5 wherein the stop means is adjustable to prevent the magnetic means from moving more than the predetermined distance from the first position of the first magnet means.

7. A pressure-responsive device according to claim 1, comprising thermostat means operable to prevent the magnetic means from moving away from the first position when the temperature is below a predetermined level.

8. A pressure-responsive device according to claim 1, comprising switch means operable by motion of the magnetic means away from the assembly.

9. A pressure-responsive device according to claim 8 including stop means adjustable to prevent movement of the magnetic means more than the predetermined distance from the first position.

10. A pressure-responsive device according to claim 8, including thermostat means operable to prevent the magnetic means from moving away from the assembly when the temperature is below a predetermined value.

11. A pressure-responsive device according to claim 1, comprising an indicator operable by motion of the magnetic means away from the assembly.

12. A pressure-responsive device comprising a housing, flexible diaphragm means movably mounted in the housing, first magnet means movable with the diaphragm toward and away from a first position, spring bias means urging the magnetic means and diaphragm in one direction and normally retaining the first magnetic means in the first position, first fluid duct means communicating with a first source of fluid under pressure and with one face of the diaphragm to urge it and the first magnet means in the opposite direction, second fluid duct means communicating with a second source of fluid under pressure and with the other face of the diaphragm, second magnet means movable toward and away from the first magnet means and normally retained toward the first magnet means by magnetic attraction when the first magnet means is in the first position, and spring bias means urging the second magnet means away from the first magnet means, selected to overcome the force of magnetic attraction when the first magnet means is more than a predetermined distance away from the second magnet means.

References Cited in the file of this patent
UNITED STATES PATENTS

| | | |
|---|---|---|
| 1,412,698 | Malivert | Apr. 11, 1922 |
| 2,750,915 | Carlberg | June 19, 1956 |
| 2,942,572 | Pall | June 28, 1960 |